United States Patent
Anwar

(10) Patent No.: US 7,137,673 B2
(45) Date of Patent: Nov. 21, 2006

(54) VEHICLE YAW STABILITY SYSTEM AND METHOD

(75) Inventor: Sohel Anwar, Canton, MI (US)

(73) Assignee: Visteon Global Technologies, Inc., Van Buren Township, MI (US)

(*) Notice: Subject to any disclaimer, the term of this patent is extended or adjusted under 35 U.S.C. 154(b) by 124 days.

(21) Appl. No.: 10/608,906

(22) Filed: Jun. 27, 2003

(65) Prior Publication Data

US 2004/0262991 A1   Dec. 30, 2004

(51) Int. Cl.
   *B60T 8/60*   (2006.01)
   *F16F 15/03*   (2006.01)
(52) U.S. Cl. .................. 303/146; 188/267; 188/164
(58) Field of Classification Search ............ 303/140, 303/146, 125; 188/267, 159, 161, 162, 164
   See application file for complete search history.

(56) References Cited

U.S. PATENT DOCUMENTS

| | | | |
|---|---|---|---|
| 4,243,901 A | 1/1981 | Vorona et al. | |
| 4,398,111 A | 8/1983 | Zuch | |
| 4,864,173 A | 9/1989 | Even | |
| 4,998,593 A | 3/1991 | Karnopp et al. | |
| 5,187,433 A | 2/1993 | Even | |
| 5,261,503 A | 11/1993 | Yasui | |
| 5,351,795 A | 10/1994 | Dadel et al. | |
| 5,482,133 A | 1/1996 | Iwata et al. | |
| 5,506,770 A | 4/1996 | Brachert | |
| 5,671,143 A | 9/1997 | Graber | |
| 5,694,321 A | 12/1997 | Eckert et al. | |

(Continued)

FOREIGN PATENT DOCUMENTS

EP   0 660 502   2/1996

OTHER PUBLICATIONS

Hedrick, J., "Analysis And Control Of Nonlinear Systems," Journal Of Dynamic Systems, Measurement, and Control, 115:351-361 (Jun. 1993).

(Continued)

*Primary Examiner*—Robert A. Siconolfi
(74) *Attorney, Agent, or Firm*—Dickinson Wright PLLC

(57) ABSTRACT

A yaw stability system for a vehicle as well as methods for controlling yaw in a vehicle and estimating the retarding torque of an electromagnetic retarder. The yaw stability system includes a yaw rate sensor, a plurality of braking devices, and a control unit. The control unit communicates with the yaw rate sensor and is configured to identify a desired yaw rate, select one or more of the plurality of braking devices based on a yaw condition, and communicate a control command to one or more of the selected braking devices to induce a control yaw moment. The method for controlling yaw includes determining a vehicle yaw rate and desired yaw rate, calculating a yaw rate error, determining a control yaw moment using a sliding mode control law based on a lumped mass vehicle model, selecting one of the braking devices based on a vehicle yaw condition, determining a control command based on the control yaw moment, and communicating the control command to one of the selected braking devices. The method of estimating retarding torque includes modeling the estimated retarding torque based on a quadratic function of a control element velocity and a magnitude of a retarder excitation current as well as estimating coefficient functions of the quadratic relationship from steady state test data performed at various rotor speeds.

17 Claims, 9 Drawing Sheets

U.S. PATENT DOCUMENTS

| | | | |
|---|---|---|---|
| 5,702,165 | A | 12/1997 | Koibuchi |
| 5,710,704 | A | 1/1998 | Graber |
| 5,710,705 | A | 1/1998 | Eckert |
| 5,711,023 | A | 1/1998 | Eckert et al. |
| 5,711,024 | A | 1/1998 | Wanke |
| 5,711,025 | A | 1/1998 | Eckert et al. |
| 5,774,821 | A | 6/1998 | Eckert |
| 5,830,105 | A | 11/1998 | Iizuka |
| 5,862,503 | A | 1/1999 | Eckert et al. |
| 5,947,863 | A | 9/1999 | Grob et al. |
| 5,948,027 | A | 9/1999 | Oliver, Jr. et al. |
| 5,983,149 | A | 11/1999 | Tate et al. |
| 6,003,959 | A | 12/1999 | Katayose et al. |
| 6,064,930 | A | 5/2000 | Shibahata |
| 6,089,680 | A | 7/2000 | Yoshioka et al. |
| 6,150,780 | A | 11/2000 | Young et al. |
| 6,205,375 | B1 | 3/2001 | Naito |
| 6,212,460 | B1 | 4/2001 | Rizzo et al. |
| 6,216,079 | B1 | 4/2001 | Matsuda |
| 6,219,610 | B1 | 4/2001 | Araki |
| 6,226,587 | B1 | 5/2001 | Tachihata et al. |
| 6,233,513 | B1 * | 5/2001 | Furukawa et al. ............. 701/74 |
| 6,267,705 | B1 | 7/2001 | Rose et al. |
| 6,272,418 | B1 | 8/2001 | Shinmura et al. |
| 6,273,529 | B1 | 8/2001 | Woywod et al. |
| 6,286,637 | B1 * | 9/2001 | Park et al. ................... 188/158 |
| RE37,522 | E | 1/2002 | Karnopp et al. |
| 6,334,656 | B1 * | 1/2002 | Furukawa et al. .......... 303/146 |
| 6,349,789 | B1 | 2/2002 | Nakano et al. |
| 6,371,234 | B1 | 4/2002 | Yasuda |
| 6,415,215 | B1 | 7/2002 | Nishizaki et al. |
| 6,619,760 | B1 * | 9/2003 | Anwar ....................... 303/20 |
| 2002/0095251 | A1 | 7/2002 | Oh et al. |

OTHER PUBLICATIONS

Kiencke, U. et al., "Automotive Control System For Engine, Driveline, And Vehicle," published by SAE International, pp. 250-269 (2000).

* cited by examiner

VEHICLE YAW STABILITY SYSTEM AND METHOD

BACKGROUND OF THE INVENTION

1. Technical Field

The present invention relates to a yaw stability system for a vehicle and, more particularly, to a yaw stability system having a control unit using a sliding mode control technique to determine a control yaw moment.

2. Description

Yaw Stability Control (YSC) systems have been in use in the automotive industry for a number of years to increase the stability of the vehicle and to enhance vehicle performance. In general, YSC corrects the under-steering and over-steering of the vehicle in a handling maneuver (e.g. lane change, slalom, etc.), particularly on a low friction surface. It also helps the driver maintain yaw stability of the vehicle in a severe handling maneuver.

The effectiveness of YSC systems varies widely depending on the system design. YSC systems commonly seek to minimize tracking error between a desired vehicle yaw rate and an actual vehicle yaw rate by selectively actuating braking mechanisms associated with the wheels of the vehicle. When a braking mechanism is actuated, the brake exerts a torque on the wheel which in turn induces a vehicle yaw moment. Most YSC systems are based on control techniques that rely on empirical data and are heavily dependent on testing. Systems based on "on-off" control techniques commonly fail to consider the magnitude of the tracking error other than to determine the desired braking torque. For example, the systems do not "over-actuate" a braking device if the magnitude of the tracking error exceeds a predetermined threshold or boundary layer. This deficiency in existing YSC systems often leads to undesirable braking device chatter as the devices are repeatedly actuated.

Moreover, conventional YSC systems commonly use hydraulically actuated friction based braking devices to induce control yaw moments. While these systems are generally suitable, they suffer from undesirably long response times and lack of smoothness during operation. The harsh operation of the braking systems induce undesirable noise, vibration, and harshness (NVH) during operation.

As is discussed in detail in this application, one feature of the present invention is the use of electromagnetic retarders, preferably eddy current machines, as YSC braking devices. While electromagnetic retarders have been used in braking systems for commercial trucks for many years, these retarders are generally not used in YSC systems for a number of reasons, including difficulty in accurately modeling the torque characteristics of the retarder. One modeling consideration of particular interest in YSC systems is the ability to obtain an accurate estimation of the retarding torque generated by an electromagnetic retarder. Accurate torque estimation is important for providing consistent performance. One conventional estimation technique requires an initial estimation of armature temperature which is then used in the torque calculation. Others have estimated electromagnetic retarder braking torques using predetermined look up tables of torque versus peak voltage between the retarder poles at various rotor speeds. Yet others have modeled eddy current brakes as a function of excitation current and rotor speed. However, each of the aforementioned techniques suffers from inaccuracies, assumptions that are not appropriate for many operating conditions, and/or computational intensity.

Thus, a need exists for an accurate and systematic YSC approach that minimizes or eliminates undesirable chattering, reduces dependence on empirical data and testing, improves response time, and minimizes NVH.

SUMMARY OF THE INVENTION

The present invention is generally directed to a robust YSC method that improves vehicle yaw stability performance. Another aspect of this invention is a vehicle yaw stability system that utilizes electromagnetic devices to generate a control yaw moment. The YSC system of the present invention is based on a sliding mode control theory and, in the illustrated embodiment, utilizes eddy current electromagnetic retarders. The rapid response from the eddy current retarders is aided by the sliding mode control law and the smooth control of the electromagnetic machines provides improved NVH relative to hydraulically actuated friction braking devices. Further, the robustness in the controller maintains good performance even in the presence of external disturbances.

In one embodiment, the invention is directed to a yaw stability system for a vehicle having a plurality of wheels each with a torque element. The yaw stability system includes a yaw rate sensor, a plurality of braking devices, and a control unit. The control unit communicates with the yaw rate sensor and is configured to identify a desired yaw rate, determine a yaw rate tracking error, determine a yaw condition of the vehicle based on the vehicle yaw rate, determine a control yaw moment to minimize the yaw rate tracking error, select one or more of the plurality of braking devices based on the yaw condition, and communicate a control command to one or more of the selected braking devices to induce the control yaw moment.

In another embodiment, the present invention is directed to a method for controlling yaw in a vehicle. The method includes determining a vehicle yaw rate and desired yaw rate, calculating a yaw rate error, determining a control yaw moment using a sliding mode control law based on a lumped mass vehicle model, selecting one of the braking devices based on a vehicle yaw condition, determining a control command based on the control yaw moment, and communicating the control command to one of the selected braking devices.

In still another embodiment, the present invention is directed to a method of estimating the retarding torque of an electromagnetic retarder. The method includes modeling the estimated retarding torque based on a quadratic function of a control element velocity and a magnitude of a retarder excitation current. The method further includes estimating coefficient functions of the quadratic relationship from steady state test data at various rotor speeds.

In a further embodiment, the invention is directed to an electromagnetic retarder assembly including an electromagnetic retarder, a sensor, and a controller. The electromagnetic retarder has a stator with conductive windings and a rotor rotatable relative to the stator. The sensor senses the rotational speed of the rotor and generates signals indicative of the rotational speed. The controller communicates with the sensor to receive the signals and is configured to communicate an excitation current to the electromagnetic retarder. The controller is also configured to estimate the retarding torque of the retarder based on a quadratic function of the velocity of the rotor and the magnitude of the excitation current.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

FIG. 1($b$) is a schematic illustration similar to FIG. 1($a$) illustrating control yaw moment generation via braking forces;

DETAILED DESCRIPTION OF THE PREFERRED EMBODIMENT

Figure 1A:
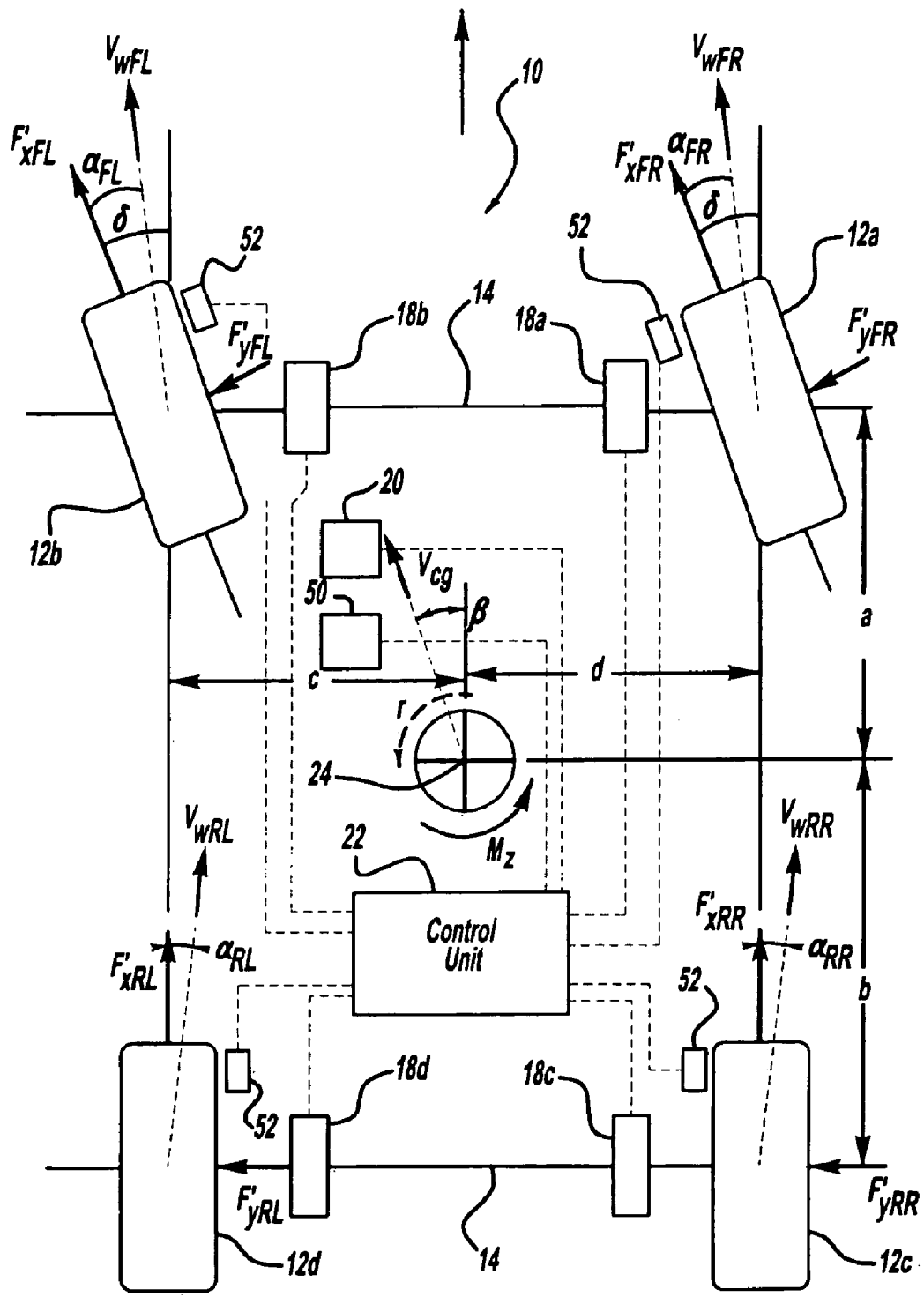
FIG. 1($a$) is a schematic illustration of a vehicle having a YSC system according to the present invention and representing vehicle yaw dynamics in a non-braking condition.
Figure 1B:
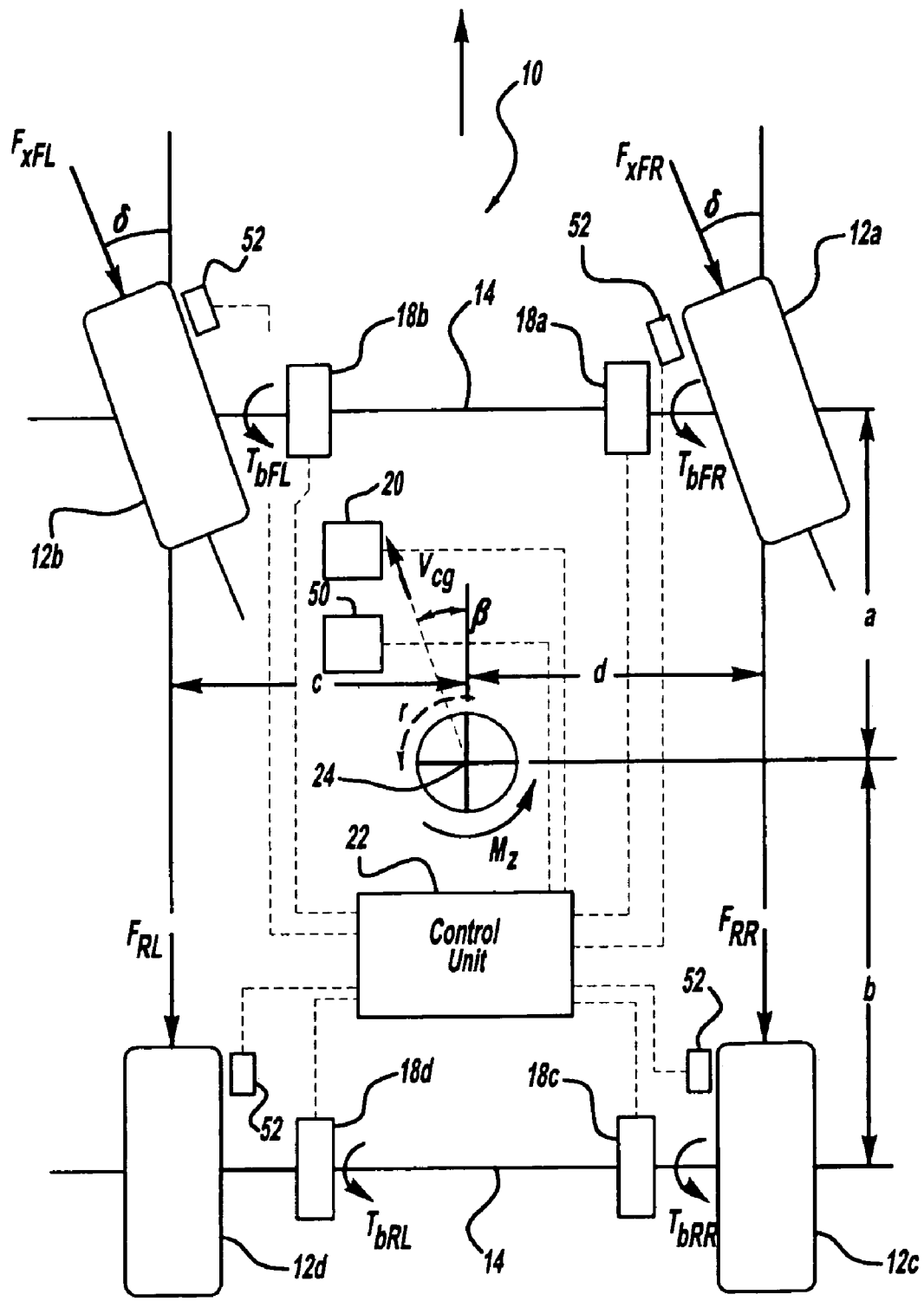

FIG. 1($a$) schematically illustrates a vehicle 10 having a plurality of wheels 12 rotating with shafts 14. The vehicle includes a YSC system illustrated to include braking devices 18$a$–18$d$ associated with each of the wheels, a yaw rate sensor 20, and a control unit 22. During operation, any change in the direction of the vehicle 10 generates a yaw rate about the vehicle's center of gravity (CG) 24. While a certain yaw rate is desired for proper vehicle turning, the vehicle operator may place the vehicle in oversteer or understeer conditions where the vehicle yaw rate differs from the desired yaw rate. The control unit 22 seeks to identify and correct the tracking error between the measured vehicle yaw rate and the desired yaw rate.

The YSC system uses a systematic approach to control vehicle yaw rates. This systematic approach, based in part on using a sliding mode control law in combination with a lumped mass vehicle model to determine a control yaw moment, improves the system response time, enhances vehicle yaw rate tracking to the desired yaw rate, and improves controller robustness and stability when compared to conventional systems. The YSC system described in detail herein uses electromagnetic retarders, particularly though not necessarily eddy current machines, as the braking devices 18. While the use of electromagnetic retarders provides numerous operational benefits over conventional systems it should be recognized that the control strategy may be used with YSC systems incorporating other braking mechanisms, including friction brakes.

Figure 4:
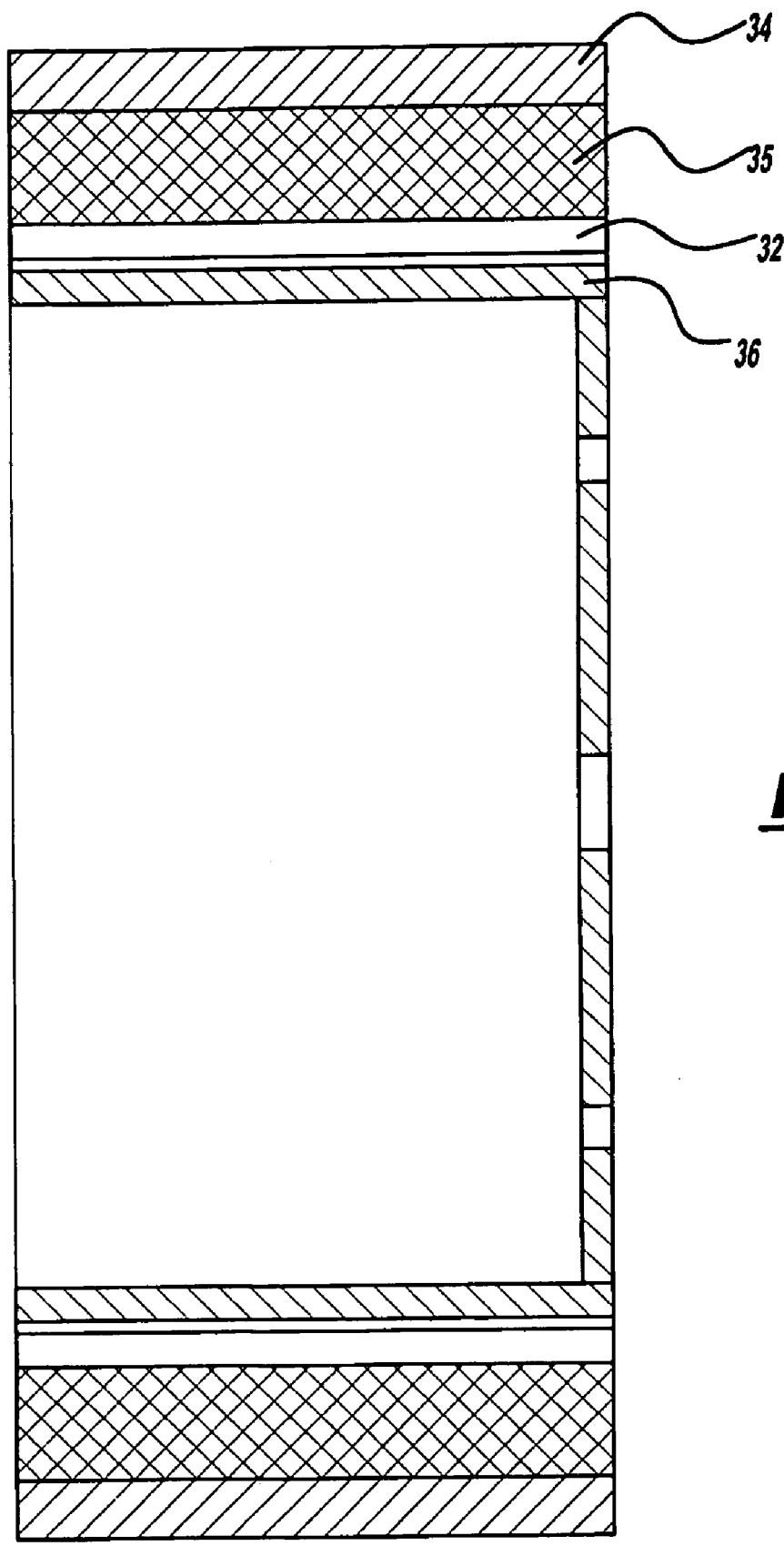
FIG. 4 is a sectional view of a representative eddy current machine for the torque actuating devices shown in FIG. 1.

An electromagnetic retarder or brake suitable for use as a braking device is illustrated in FIG. 4. Retarders of the type illustrated in FIG. 4 and described herein are generally known in the art and follow the basic principles of electromagnetic induction. In general, the retarder (illustrated as an eddy current machine) has an iron core 32, a stator 34, conductive windings 35, and a rotor 36 fixed to rotate with the wheel shaft (not shown). Providing the stator windings 35 with an excitation current induces an eddy current in the stator and a retarding force which acts on the rotor 36. A conventional sensor monitors the rotational speed of the rotor 36 and communicates a rotational velocity signal to the control unit 22. The electromagnetic retarders may be used as secondary retarders for each vehicle wheel or as the primary braking system for the vehicle.

The operation of the control unit 22 will now be described with reference to the flow charts illustrated in FIGS. 2 and 3. As an overview, the control unit 22 receives input from conventionally configured sensors or stored data and determines and communicates a current command to one or more of the electromagnetic retarders to minimize yaw rate tracking error. The control unit 22 is generally configured in a conventional manner to carry out the tasks described herein. Thus, it will be appreciated that the control unit 22 may take a variety of forms without departing from the scope of the present invention. By way of example, it is contemplated that the control unit 22 includes a microprocessor with a calculation module, a memory or data structure for storing and/or retrieving data, as well as appropriate input and output circuits for receiving the various input signals and communicating control commands to YSC system components such as the retarders.

For ease of explanation, the control strategy is separated into four stages: (1) determining the yaw condition (i.e., understeer or oversteer) of the vehicle (Step 40 in FIG. 2) such as by comparing the vehicle yaw rate determined from the yaw rate sensor 20 to a desired yaw rate; (2) determining a control yaw moment ($M_z$) if the yaw rate error (i.e., the difference between the desired and measured yaw rates) exceeds a threshold (Step 42); (3) determining a torque command for the braking devices 18 (Step 44) to correct the error; and (4) calculating an appropriate control command for one or more of the braking devices (Step 46). While each of these steps are described below and illustrated in FIGS. 2 and 3 in the sequence set forth above and using specific relationships and equations, it should be appreciated that the sequence of the steps and the manner in which the determinations are made may be varied without departing from the scope of the invention defined by the appended claims. By way of example rather than limitation, it is noted that the determination of the control yaw moment (Step 42) is described as being performed using the relationship set forth below in Equation (8) below and after the determination of the yaw condition (Step 40). However, as the described manner of determining the control yaw moment is independent of the yaw condition, the control yaw moment may be determined before the determination of the yaw condition. Moreover, while the relationships used to determine the control yaw moment provide operational benefits related, for example, to calculation efficiencies and accuracy, other methods for calculating the control yaw moment ($M_z$) may be used.

The YSC system has access to various conventional sensors or stored data to facilitate the performance of the calculations discussed herein. For example, the control unit 22 is shown in FIGS. 1 and 3 to communicate with a steering wheel angle sensor (50), the vehicle yaw rate sensor (20), and wheel speed sensors 52 as well as to have access to estimated road friction coefficients, wheel patch normal forces, and slip angles. A variety of suitable techniques for measuring or estimating these parameters are generally known in the art and widely published in available literature. One skilled in the art will also recognize that conventional mechanisms (such as Kalman filter, fuzzy logic, or observer) may be used to tailor the parameter estimation for a particular application.

1. Determination of Yaw Condition

As noted above, the control unit 22 of the YSC system seeks to minimize the tracking error between the desired vehicle yaw rate and the measured yaw rate. The tracking error is represented below in equation (1) as the sliding or yaw rate error surface (S):

$$S = r_{des}(t) - r(t) \qquad (1)$$

where $r_{des}(t)$=Desired vehicle yaw rate at time t; and $r(t)$=Vehicle yaw rate at time t.

In the preferred embodiment of the present invention, the desired vehicle yaw rate is determined for a number of vehicle operating conditions and stored in a data structure (such as via a look-up table) with which the control unit 22 communicates. The desired values for the yaw rate are preferably based on experimental measurements performed prior to implementation of the system in the vehicle. Those skilled in the art will appreciate that a variety of techniques may be used to determine and store desired vehicle yaw rate values for access by the controller. The vehicle yaw rate at any given time is preferably obtained from the yaw rate sensor 20 shown in FIG. 1.

In Step 60 (FIGS. 2 and 3), the control unit 22 determines whether the tracking error exceeds a threshold. This threshold may be determined in any number of ways known in the art. In general, the threshold is determined so as to minimize calculation complexity without negatively impacting vehicle performance. Factors impacting the selection of an appropriate threshold include the occupants' perception of understeer/oversteer conditions, vehicle stability limits, the value of the measured yaw rate, road friction coefficients, etc. Accordingly, it is anticipated that the control unit 22 will communicate with a data structure having a look-up table identifying the threshold for a number of vehicle operating conditions.

Figure 3:
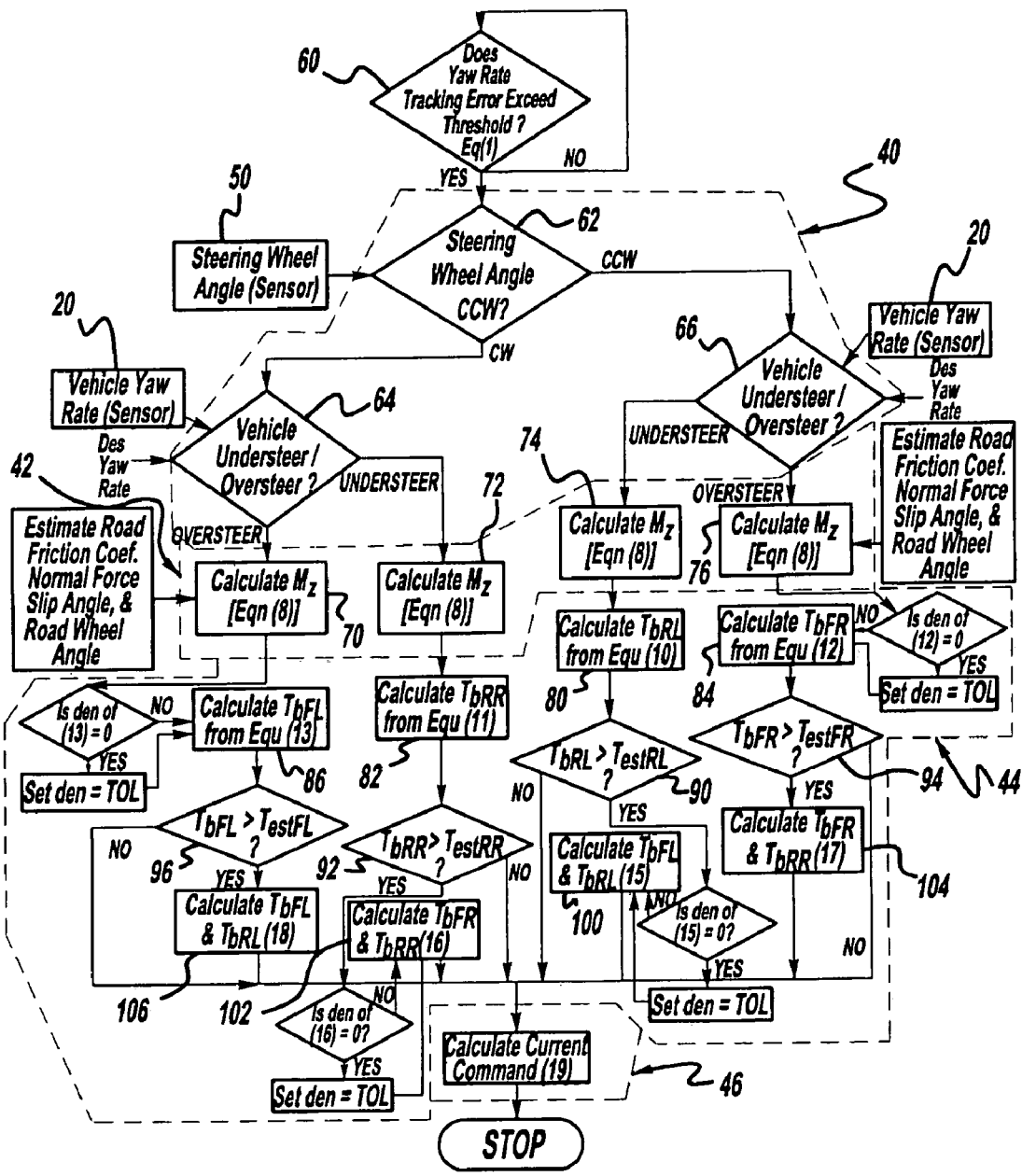
FIG. 3 is a flow chart illustrating a suitable control strategy for a control unit of the present invention.

As is indicated in Step 60 of FIG. 3, if the measured vehicle yaw rate does not exceed the threshold, the control unit 22 proceeds no further through the control strategy and performs the threshold comparison at predetermined intervals. In the event the yaw rate exceeds the threshold, the control unit 22 proceeds to Step 40 to determine the yaw condition of the vehicle. With input from the vehicle yaw rate sensor 20, steering wheel angle sensor 50, and information regarding the desired yaw rate, the control unit 22 determines the direction of the steering wheel angle (Step 62) and the vehicle yaw condition (Steps 64 and 66). There are two situations that accompany yaw instability—understeering and oversteering. In an understeer condition the absolute value of the vehicle yaw rate, r, is smaller than the absolute value of desired vehicle yaw rate, $r_{des}$. Conversely, in an oversteer condition, the absolute value of the vehicle yaw rate, r, is larger than the absolute value of desired vehicle yaw rate, $r_{des}$. Based on this relationship, the control unit 22 determines in Steps 64 and 66 whether the yaw instability is due to an understeer or oversteer condition.

2. Determination of Control Yaw Moment.

Figure 2:
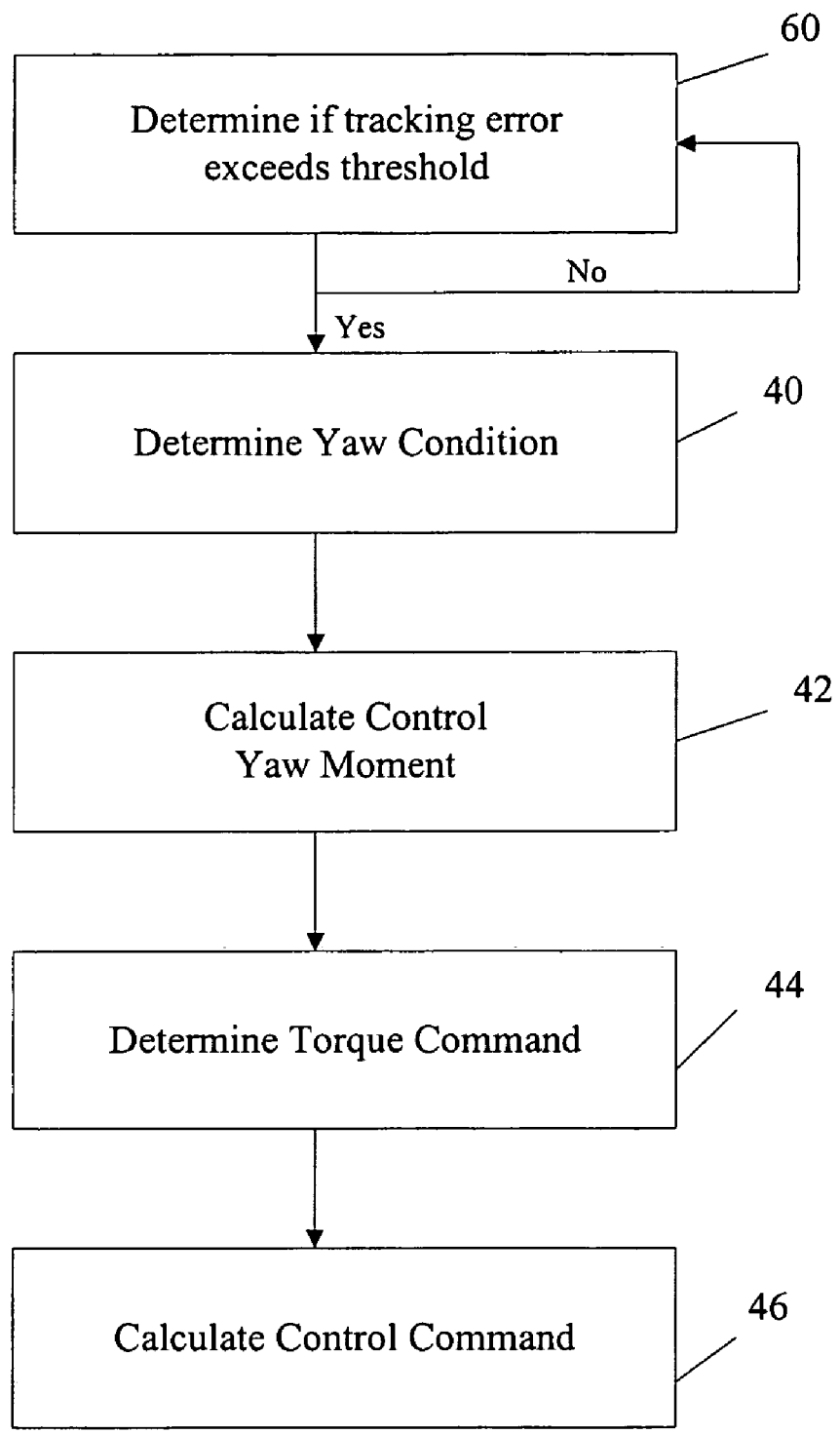
FIG. 2 is a flowchart illustrating an overview of the control unit control strategy.

The determination of the control yaw moment, $M_z$, is represented by Step 42 in FIGS. 2 and 3. For clarity, the determination of the control yaw moment in Step 42 is shown as separate calculation Steps 70, 72, 74, and 76 for each of the yaw conditions determined in Step 40. However, as indicated in FIG. 3 and described herein, the control yaw moment in each instance is preferably calculated based upon Equation (8) below.

The control unit 22 may use a variety of vehicle yaw dynamic relationships generally known in the art to determine the control yaw moment. In the embodiment specifically described herein, the control unit 22 uses a sliding mode technique based on lumped mass vehicle model. Unlike conventional YSC systems (such as those based on Proportional Integral and Derivative Control (PIDC)), use of a sliding mode technique based on a lumped mass vehicle model for the YSC system provides fast response and robustness with respect to external disturbances. As fundamentals of the sliding mode control law are generally known in the art, all details of the technique are not described in detail herein. However, Equations (2) through (8) and the related descriptions illustrate the technique in a manner that is sufficient for use with the invention. Using the lumped mass model, the vehicle yaw dynamics can be obtained as follows:

$$I_{ZZ}\frac{dr}{dt} = a(F'_{yFL}\cos\delta_1 + F'_{xFL}\sin\delta_1 + F'_{yFR}\cos\delta_2 + F'_{xFR}\sin\delta_2) - \\ b(F'_{yRR} + F'_{yRL}) + c(F'_{yFL}\sin\delta_1 - F'_{xFL}\cos\delta_1 - F'_{xRL}) - \\ d(F'_{yFR}\sin\delta_2 - F'_{xFR}\cos\delta_2 - F'_{xRR}) + M_z \qquad (2)$$

where $I_{ZZ}$=Vehicle yaw inertia;

$M_z$=Control yaw moment;

$F'_{xFL}$, $F'_{yFL}$, $F'_{xFR}$, $F'_{yFR}$, $F'_{xRL}$, $F'_{yRL}$, $F'_{yRR}$, $F'_{yRR}$=Tire contact patch forces in x- and y-directions in a non-braking condition as illustrated in FIG. 1(*a*);

$\delta_1$, $\delta_2$=Road wheel angle for the front wheels; and a, b, c, d=Contact patch locations from the vehicle center of gravity ("CG")

In equation (2), the road wheel angle for the front wheels (12a, 12b) may be determined through the use of conventional steering wheel angle sensor 50 or road wheel angle sensor 52. The contact patch locations relative to the vehicle CG are illustrated in FIG. 1(*a*), are known, and may be stored for use by the control unit in any conventional manner such as in a look-up table. To simplify the calculation of equation (2), the control strategy assumes that the road wheel angle for the front left tire 12b is equal to the road wheel angle for the front right tire 12a and that the wheel separation is the same for the front and rear wheels.

Rewriting equation (2), we obtain, $$I_{ZZ}\dot{r} = a[(F'_{yFL} + F'_{yFR})\cos\delta + (F'_{xFL} + F'_{xFR})\sin\delta] - b \\ (F'_{yRR} + F'_{yRL}) + c(F'_{yFL}\sin\delta - F'_{xFL}\cos\delta - F'_{xRL}) - \\ d(F'_{yFR}\sin\delta - F'_{xFR}\cos\delta - F'_{xRR}) + M_z \qquad (3)$$

As is shown in equation (4) below, control unit 22 operates on the following further assumptions: (1) that the normal force ($F_{zX}$) on the left and right side of the vehicle is same (i.e., the normal force on the front left contact patch is the same as that on front right contact patch, etc.); (2) that the rolling resistance coefficients ($\eta_{ij}$) dictate longitudinal forces at tire contact patches; and (3) that the lateral friction forces vary linearly with the slip angle ($\alpha$) for each wheel.

$$F_{zFL} = F_{zFR} = F_{zF}; F_{zRL} = F_{zRR} = F_{zR}; F'_{xFL} = \eta_{FL} F_{zF};$$
$$F'_{xFR} = \eta_{FR} F_{zF}; F'_{xRL} = \eta_{RL} F_{zR};$$
$$F'_{xRR} = \eta_{RR} F_{zR}; \alpha_{FL} = \alpha_{FR} = \alpha_F;$$
$$\alpha_{RL} = \alpha_{RR} = \alpha_R; F'_{yFL} = C_{FL} \alpha_F; F'_{yFR} = C_{FR} \alpha_F;$$
$$F'_{yRL} = C_{RL} \alpha_R; F'_{yRR} = C_{RR} \alpha_R \qquad (4)$$

where $C_{FL}$, $C_{FR}$, $C_{RL}$, & $C_{RR}$ are the cornering coefficients from a two track vehicle model which may be determined based on experimental data in a manner generally known in the art.

$\alpha_{FL}$, $\alpha_{FR}$, $\alpha_{RL}$, & $\alpha_{RR}$ are slip angles associated with each wheel determined in a conventional manner.

$\eta_{FL}$, $\eta_{FR}$, $\eta_{RL}$, & $\eta_{RR}$ are the rolling resistance coefficients associated with each road-tire contact patch determined in a conventional manner.

The simplification set forth in Equation (4) provides the following yaw dynamics equation for determining the rate of change of the vehicle yaw rate ($\dot{r}$):

$$\dot{r} = \frac{1}{I_{zz}} a[(C_{FL} + C_{FR})\alpha_F \cos\delta + (\eta_{FL} + \eta_{FR}) F_{zF} \sin\delta] - \qquad (5)$$
$$b(C_{RR} + C_{RL})\alpha_R + (c * C_{FL} - d * C_{FR})\alpha_F \sin\delta -$$
$$c(\eta_{FL} F_{zF} \cos\delta + \eta_{RL} F_{zR}) + d(\eta_{FR} F_{zF} \cos\delta + \eta_{RR} F_{zR}) + M_z$$

As noted above, the control unit 22 uses a sliding mode control law which, in general, generates the following relationship between the sliding surface and its gradient ($\dot{S}$):

$$\dot{S} = -\eta SAT\left(\frac{S}{\phi}\right)$$

which, when substituting the relationship of Equation (1), provides:

$$\dot{r}_{des} - \dot{r} = -\eta SAT\left(\frac{r_{des} - r}{\phi}\right) \qquad (6)$$

where

S=is the sliding or yaw rate error surface as set forth in Equation (1);
$\eta$=Convergence factor;
$\phi$=Boundary layer thickness of control command determined; and
SAT=Saturation function The convergence factor and boundary layer thickness in Equation (6) each impact the performance of the system, particularly with respect to response time and chatter. As control within the boundary layer is smooth and stable, it is generally desirable to select parameters that rapidly bring the control within the boundary layer and maintain the control within this layer during operation. Suitable values for these parameters may be determined through tuning, such as via computer assimilation modeling and/or system prototype testing. The saturation function is a mathematical function that sets the controller output at +/−1 if the output is outside a range where the output behaves linearly. By way of example, it has been determined that a convergence factor within the range of about 50 to about 100 and a boundary layer thickness between about 5 and 15 degrees per second are suitable for a yaw stability control of a light duty truck. Notwithstanding this illustrative example, those skilled in the art will appreciate that the parameters may vary based on the application and the desired performance. Substituting the relationships of Equation (5) into Equation (6) yields:

$$M_z = I_{zz}\dot{r}_{des} - [a[(C_{FL} + C_{FR})\alpha_F \cos\delta + (\eta_{FL} + \eta_{FR}) F_{zF} \sin\delta] - \qquad (7)$$
$$b(C_{RR} + C_{RL})\alpha_R + (c * C_{FL} - d * C_{FR})\alpha_F \sin\delta -$$
$$c(\eta_{FL} F_{zF} \cos\delta + \eta_{RL} F_{zR}) + d(\eta_{FR} F_{zF} \cos\delta + \eta_{RR} F_{zR})] +$$
$$I_{zz}\eta SAT\left(\frac{r_{des} - r}{\phi}\right)$$

If the rolling resistance forces at the tire contact patches are neglected, the following control yaw moment (Mz) is obtained from Equation (7):

$$M_z = I_{zz}\dot{r}_{des} - [a(C_{FL} + C_{FR})\alpha_F \cos\delta - b(C_{RR} + C_{RL})\alpha_R + \qquad (8)$$
$$(c * C_{FL} - d * C_{FR})\alpha_F \sin\delta] + I_{zz}\eta SAT\left(\frac{r_{des} - r}{\phi}\right)$$

Each of the parameters set forth in Equations (7) and (8) are known or determinable by the control unit 22. In the illustrated example:

Tire road rolling resistance coefficients ($\eta_{ij}$) for each contact patch are estimated by conventional techniques;

Normal force ($F_{zF}$) are assumed to be the same on the left and right side of the vehicle and determined by conventional means;

Cornering coefficients ($C_{FL}$, $C_{FR}$, $C_{RL}$, and $C_{RR}$) are preferably stored in the controller database after determination by conventional means such as a two track vehicle model;

Slip angles associated with each wheel ($\alpha_F$ and $\alpha_R$) are assumed to be the same for each wheel on the front and rear axles and are determined by conventional means;

The vehicle yaw rate (r) is preferably provided by the yaw rate sensor 20;

The desired vehicle yaw rate ($r_{des}$) is determined by experimental data or data from previous developments in a manner generally known in the art;

The rate of change of the vehicle yaw rate ($\dot{r}_{des}$) is calculated from two successive measurements of the desired vehicle yaw rate ($r_{des}$); and The saturation function (SAT) represents a value of +/−1 when the absolute value of the argument of the function is greater than unity, otherwise it assumes the value of the argument itself.

Notwithstanding this representative illustration of the preferred manner of obtaining measurements or values for calculating the control yaw moment from Equation (8), those skilled in the art will appreciate that a variety of measurement or estimation techniques may be used with the present invention.

It is further noted that the term $I_{zz}$ represents the vehicle mass moment of inertia about a vertical axis through the vehicle center of gravity 24. While this term is generally constant for the vehicle, its value may vary slightly with varying vehicle load. For simplicity, the control unit 22 of the present invention assumes that the term is constant and stores the term in its data structure. The term $F_{zF}$ represents the normal force on the front contact patch and is determined by dynamic load distribution. Thus, with the other parameters of Equations (7) or (8) being known or determinable in the manner discussed above, the control unit 22 can determine the control yaw moment ($M_z$). That is, the yaw moment to induce in order to minimize the tracking error relative to the desired yaw rate.

It is noted that the above method of determining the control yaw moment provides advantages not previously recognized in the art. For example, the derivative of the desired yaw rate adds a dynamic term to the control command in order to improve responsiveness. Further, to simplify the control strategy and reduce response time, Equations (7) and (8) includes the saturation function. Notwithstanding the benefits of the above described strategy for determining the control yaw moment, it will be appreciated that other strategies and methods may be used without departing from the scope of the invention defined by the appended claims.

3. Determination of Torque Command

With the vehicle yaw condition and control yaw moment determined as described above, we now turn to the determination of the torque command communicated to the braking devices in order to induce the desired control yaw moment. Equations (10) through (19) represent the control law for the yaw control system proposed of the present invention. Step 44 represents the determination of the torque or control command based on the control yaw moment, $M_z$, calculated above. That is, the control unit 22 determines which of the braking devices 18*a*–18*d* to engage and the magnitude of the braking forces required to generate the control yaw moment. The control unit then communicates an appropriate torque or control command to one or more of the braking devices.

As noted above, the YSC system may include different types of braking devices for generating the control yaw moment. The following description is provided with reference to the illustrated embodiment of the YSC system using electromagnetic retarders, preferably eddy current machines, operatively associated with each of the vehicle wheels 12 and, more particularly, with the rotors. The control yaw moment is generated by selectively energizing one or more of the electromagnetic retarders.

In an understeer condition, the control yaw moment is generated by applying a braking force to one or more of the inner wheels (e.g., left side wheels 12*b* and/or 12*d* during a left hand turn) whereas in an oversteer condition the control yaw moment is generated by applying a braking force to one or more of the outer wheels (e.g., the right side wheels 12*a* and/or 12*c* during a left hand turn). In any of these two vehicle dynamic conditions, either both wheels or one wheel (on one side) can be braked to generate the desired control yaw moment. However, to minimize control complexity it is desirable to brake only one wheel to generate the control yaw moment. In the case of braking only one wheel, it is more effective to brake the front wheel in an oversteer condition and the rear wheel in an understeer condition.

With the above in mind, and assuming counterclockwise rotation positive and that the slip angles are small compared to road wheel angles, the relationship between the control yaw moment and brake force is, with reference to FIG. 1(*b*), as follows:

$$M_z = cF_{xFL} \cos \delta - aF_{xFL} \sin \delta - dF_{xFR} \cos \delta - aF_{xFR} \sin \delta + cF_{RL} - dF_{RR} \quad (9)$$

where $F_{xFL}$, $F_{xFR}$, $F_{RL}$, $F_{RR}$ are the braking friction forces at the tire contact patches.

Equation (9) may be solved for instances where a braking force is applied to any of the four wheels. As is generally known, the torque induced by any braking device in the YSC system is a function of the rotational speed of the control element (e.g., rotor). Therefore, while it is generally desirable to brake only a single wheel, a single braking device may not be capable of generating the desired control yaw moment. As to the illustrated embodiment using electromagnetic brakes, the relationship between the induced torque and control element speed may, in certain situations, cause a retarder to saturate. Saturation of electromagnetic retarders occurs when a maximum control current is provided to the retarder. In these instances, both front and rear wheel braking devices on a given vehicle side can be used to generate the desired yaw moment.

A. Single Wheel Braking

Equations (10)–(13) indicate the torque generated by braking one of the wheels 12*a*–12*d* in response to an understeer or oversteer condition based on the relationship set forth in Equation (9). The torques set forth in each of Equations (10)–(13) are a function of the wheel rolling radius, represented by "R".

In an understeer condition, the torque generated by braking the left rear wheel 12*d* during a left hand turn (i.e., vehicle turning counterclockwise) may be determined in Step 80 (FIG. 3) by Equation (10):

$$M_z = cF_{RL} = c\frac{T_{bRL}}{R} \quad (10)$$

$$T_{bRL} = \frac{R}{c}M_z$$

Similarly, in an understeer condition, the torque generated by braking the right rear wheel 12*c* during a right hand turn (i.e., vehicle turning clockwise) may be determined in Step 82 by Equation (11):

$$M_z = dF_{RR} = d\frac{T_{bRR}}{R} \quad (11)$$

$$T_{bRR} = \frac{R}{d}M_z$$

In an oversteer condition, the torque generated by braking the right front wheel 12*b* during a left hand turn (i.e., vehicle turning counterclockwise) may be determined in Step 84 by Equation (12):

$$M_z = (d\cos\delta - a\sin\delta)F_{xFR} = (d\cos\delta - a\sin\delta)\frac{T_{bFR}}{R} \quad (12)$$

$$T_{bFR} = \frac{R}{(d\cos\delta - a\sin\delta)}M_z$$

Finally, in an oversteer condition, the torque generated by braking the left front wheel 12*b* during a right hand turn (i.e., vehicle turning clockwise) may be determined in Step 86 by Equation (13):

$$M_z = (c\cos\delta - a\sin\delta)F_{xFL} = (c\cos\delta - a\sin\delta)\frac{T_{bFL}}{R} \quad (13)$$

$$T_{bFL} = \frac{R}{(c\cos\delta - a\sin\delta)}M_z$$

Each of the above equations (10)–(13) indicate the torque required from the respective braking devices 18a–18d to induce the control yaw moment ($M_z$) the braking of a single wheel. For completeness, it is noted that if the denominator of Equations (12) or (13) are zero, the denominator is set to a small value, indicated by TOL, to prevent overflow conditions in the control unit.

B. Torque Saturation

Figure 5:
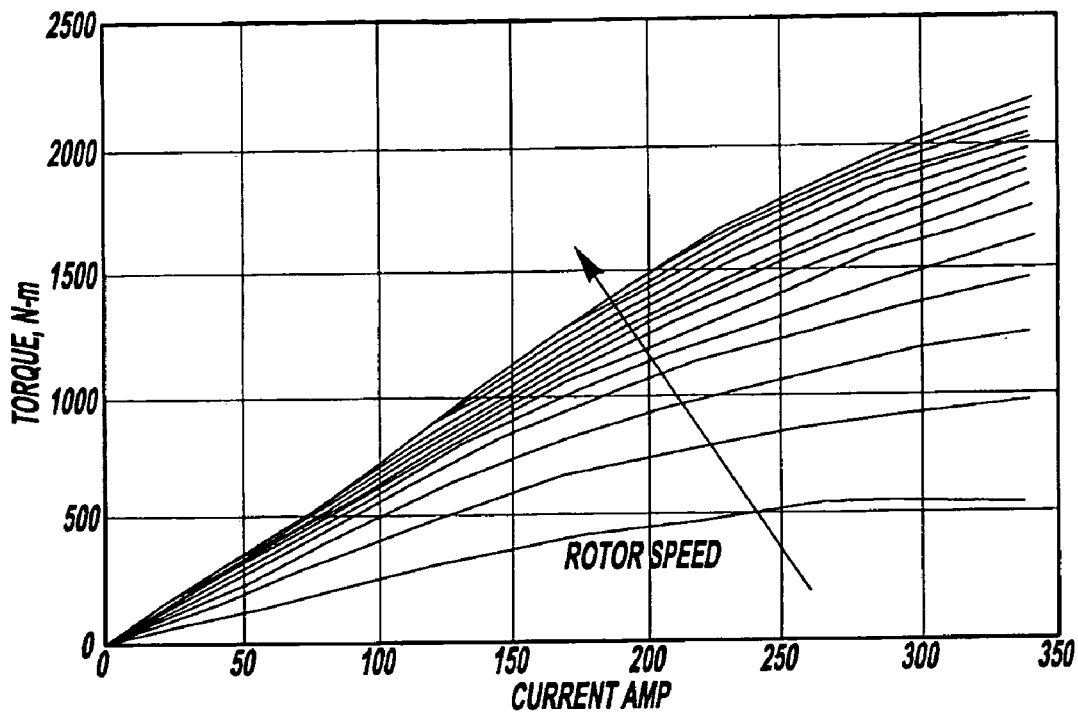
FIG. 5 is a graph showing the retarding torque versus current characteristics of the eddy current machine at various rotor speeds between 100 and 1000 RPM.
Figure 6:
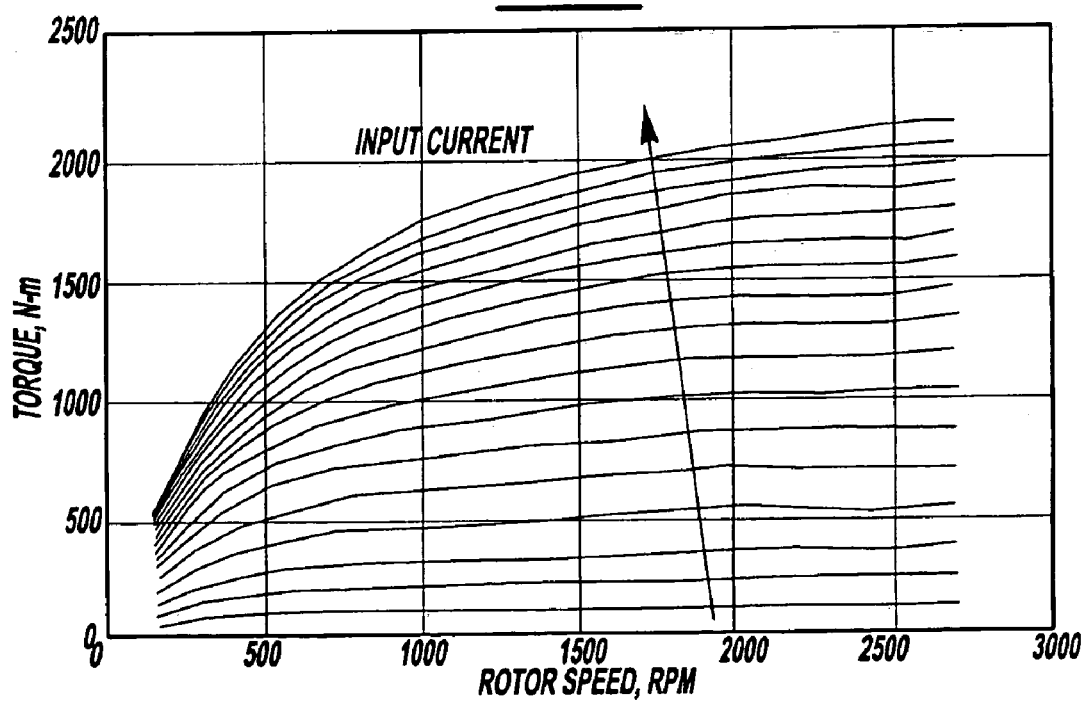
FIG. 6 is a graph showing the torque versus rotor speed characteristics of the eddy current machine at constant excitation current.

Steps 90, 92, 94, and 96 in FIG. 3 represent the comparison of the required torque from a single braking device (e.g., $T_{bRL}$ in Step 90) to the estimated torque that the braking device is capable of generating (e.g., $T_{estRL}$). The torque generated by the electromagnetic retarders is a function of rotor speed and the current supplied to each device. This relationship is illustrated by the curves shown in FIGS. 5 and 6. More particularly, FIG. 5 shows the retarding torque versus current characteristics of the eddy current machine at various rotor speeds between 100 and 1000 RPM. FIG. 6 shows the torque versus rotor speed characteristics of these machines at constant excitation current. As indicated in FIG. 3, if the required torque is less than the estimated torque, the control unit 22 proceeds to Step 46 and calculates the current command according to Equation (19) below. However, if the required torque is greater than the estimated capacity of the actuator, actuator saturation prevents the inducement of the required control yaw moment.

In identifying retarder saturation, the control unit 22 uses a torque estimation algorithm to determine the estimated torque ($T_{est}$) which an eddy current machine can generate based upon the rotor speed ($\omega$) and excitation current (i). Previous modeling of electromagnetic retarders, particularly eddy current retarders, have assumed that the braking force or torque varies linearly with speed. In the illustrated embodiment of the present control strategy, the braking torque is more accurately modeled through a quadratic function of rotor speed and excitation current. The control unit 22 is preferably an open loop controller providing a current optimal torque without the need for a current feedback signal from the retarder thereby eliminating the need for a current sensor. Further, the invention contemplates use of a computationally efficient parametric model control unit to make the YSC system suitable for implementation as production hardware. For example, a parametric model based controller requires less memory in the microprocessor as compared with a look-up table based controller. Hence both the computational and hardware cost can be reduced with a parametric model based controller.

Figure 7A:
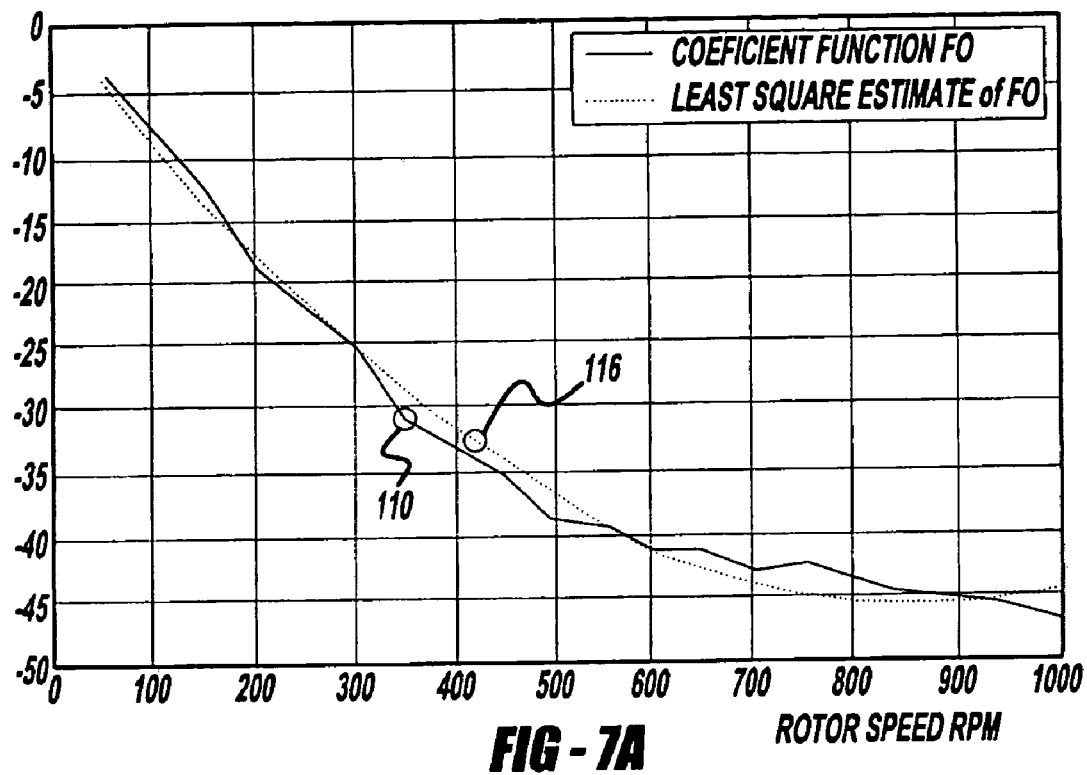
FIG. 7 includes FIGS. 7($a$), 7($b$), and 7($c$) showing the plots of coefficient functions $f_0, f_1$, and $f_2$ for a variety of rotor speeds as identified from the first set of least square fit for estimating the parameters $\alpha_{00}, \alpha_{01}, \ldots,$ and $\alpha_{22}$.
Figure 7B:
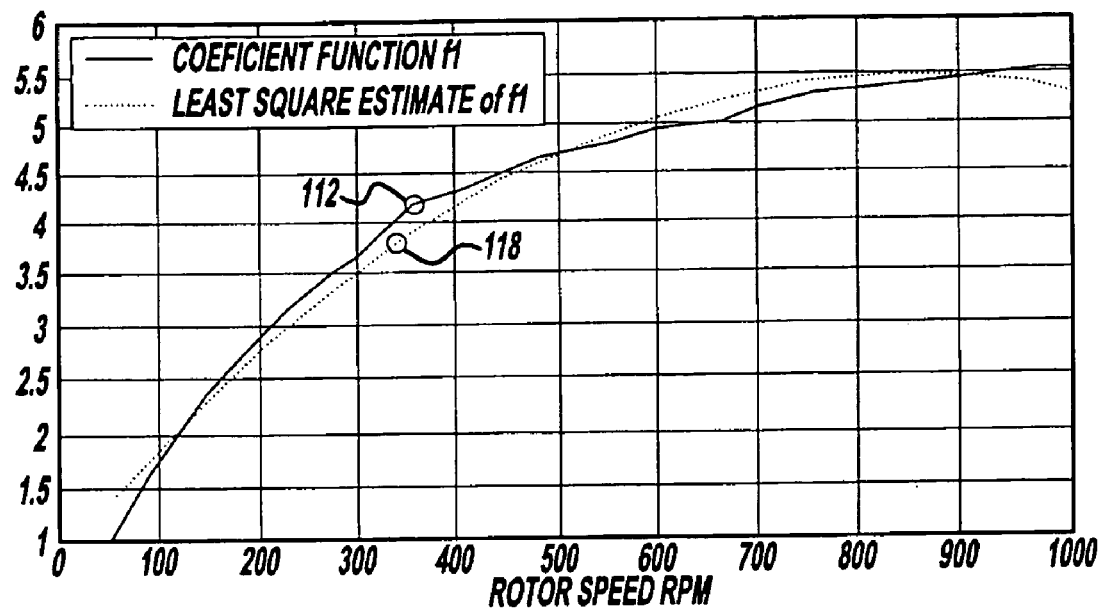
Figure 7C:
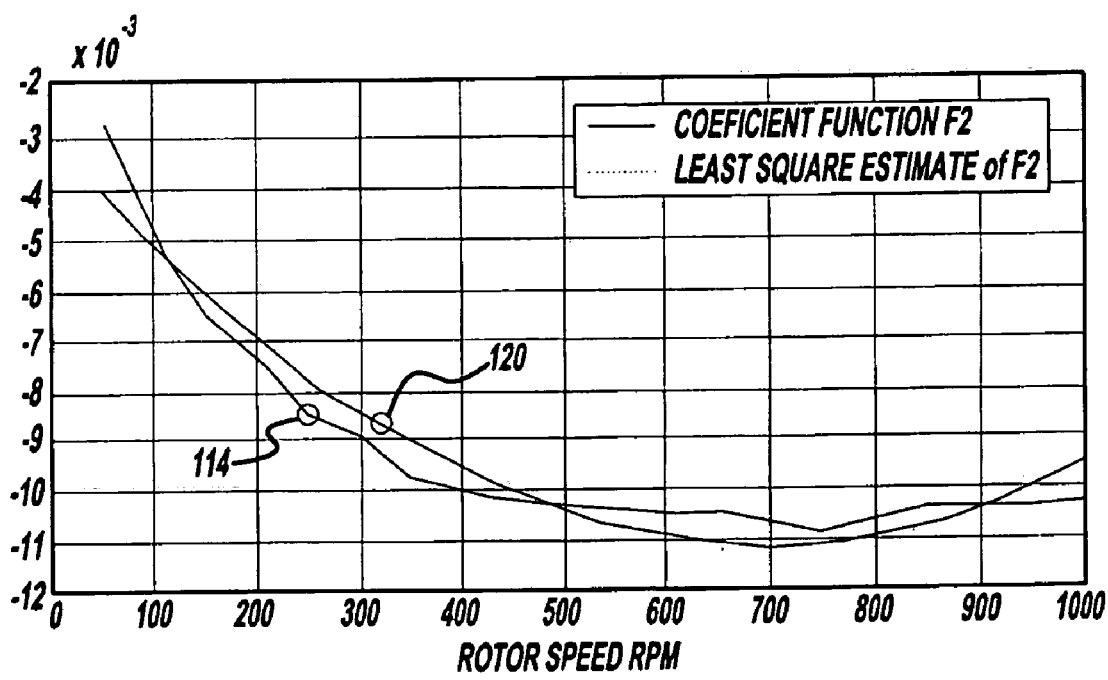

The steady state torque model for the eddy current machines is represented by the following Equation (14).

$$T_{est} = f_0(\omega) + f_1(\omega)*i + f_2(\omega)*i^2 \quad (14)$$

where
T=retarding torque
i=retarder feedback current $$f_i(\omega) = \alpha_{i0} + \alpha_{i1}\omega + \alpha_{i2}\omega^2$$

with
$\alpha_{i0}$, $\alpha_{i1}$, $\alpha_{i2}$=identified parameters
$\omega$=rotor speed The parameters $\alpha_{ij}$ (where i=0, 1, 2 and j=0,1,2) in Equation (14) are functions of the rotor speed and are estimated from steady state test data. The solid lines 110, 112 and 114 in FIGS. 7(*a*), 7(*b*), and 7(*c*), respectively, show plots of coefficient functions $f_0$, $f_1$, and $f_2$ for each rotor speed as identified through a least square estimate based on the steady state test data. The solid line plots 110, 112, and 114 of $f_0$, $f_1$, and $f_2$ are used for the initial estimate of the parameters $\alpha_{00}, \alpha_{01}, \ldots,$ and $\alpha_{22}$. The coefficient functions $f_0$, $f_1$, and $f_2$ are then re-calculated and plotted for each rotor speed based on the initial estimates of parameters $\alpha_{ij}$. The plots of these functions are shown by dotted lines 116, 118, and 120 in FIGS. 7(*a*)–(*c*). The parameters $\alpha_{ij}$ for each of the coefficient functions $f_0$, $f_1$, and $f_2$ are then re-estimated through another least square type algorithm. A variety of conventional least square fitting techniques, including the MATLAB function PLYFIT, may be used for each of the above discussed least square estimations. It is apparent that the second stage fit of the coefficient function $f_0$, $f_1$, and $f_2$ (shown by dotted lines 116, 118, and 120) match reasonably well with the first stage estimate of the coefficient functions directly from experimental data. Accordingly, FIGS. 7(*a*)–(*c*) graphically illustrate that the torque produced by the retarder is accurately modeled using a quadratic function of the excitation current and the rotor speed.

Figure 8:
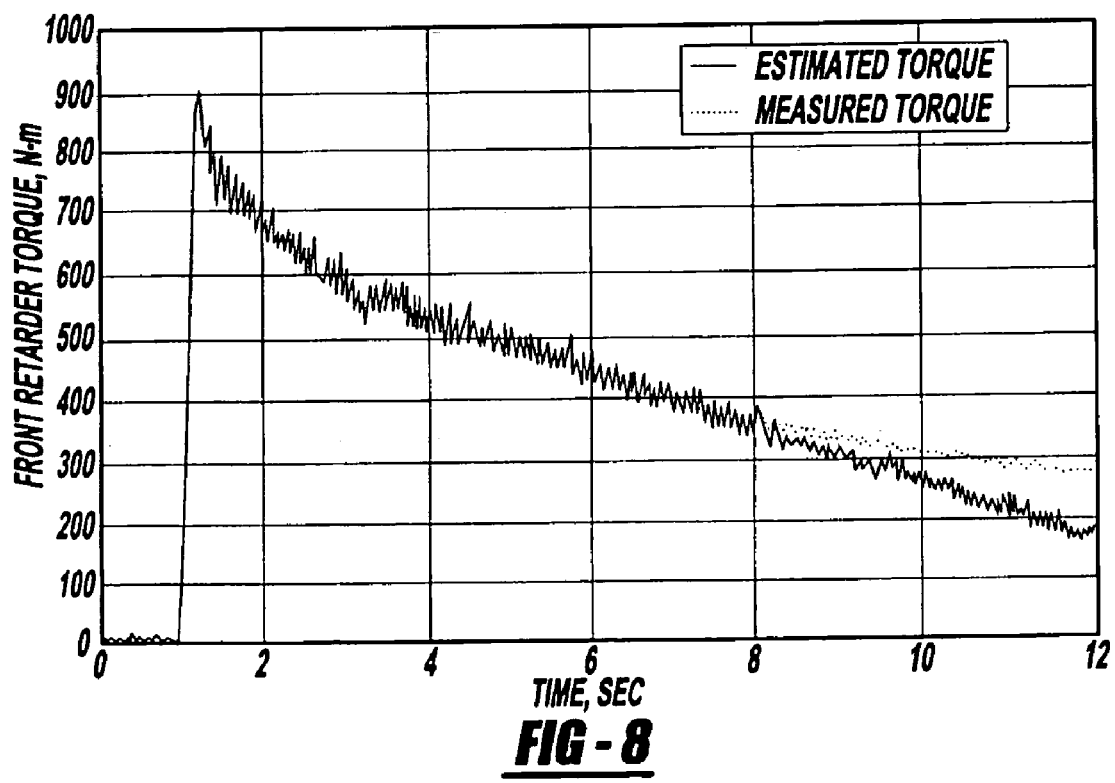
FIG. 8 is an overlay plot of estimated torque and measured torque for the front wheel retarders.
Figure 9:
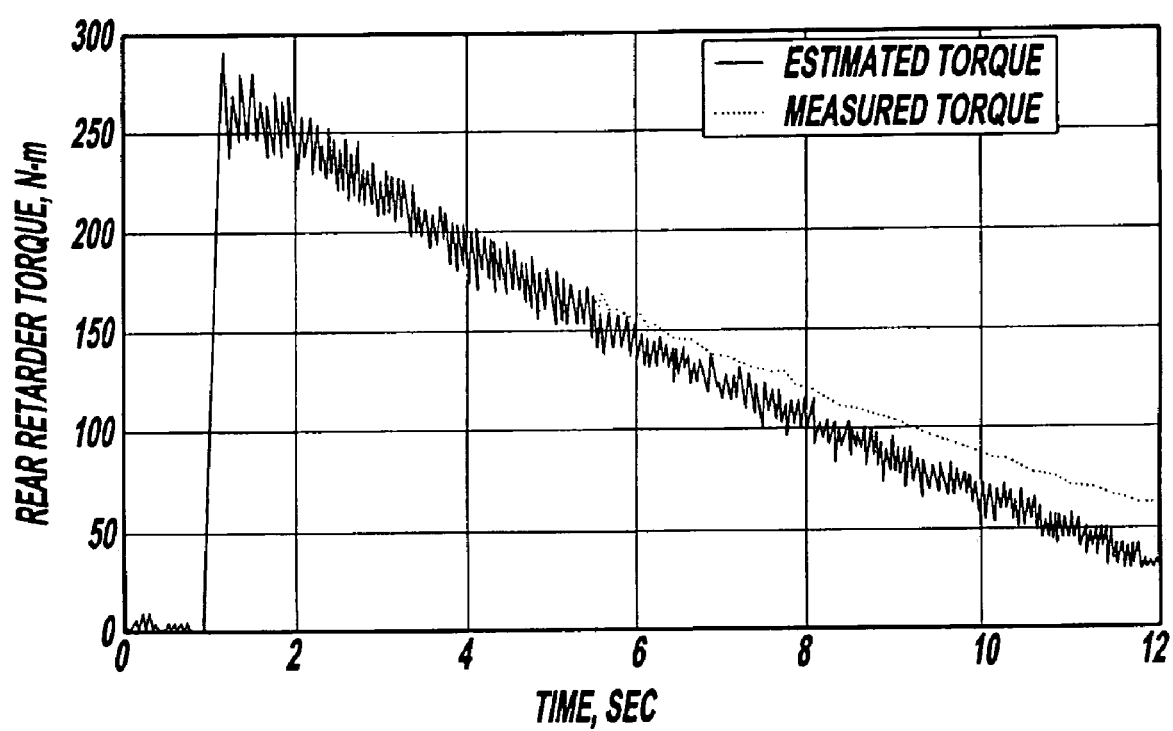
FIG. 9 is an overlay plot of estimated torque and measured torque for the rear wheel retarders.

If an eddy current machine is used as the primary vehicle braking system, the desired torque in a brake-by-wire system may be tracked in order to meet the driver's brake feel requirements (pedal displacement/force versus vehicle deceleration). It is also desirable, whether the eddy current machine is used as a primary vehicle braking system or as a secondary system in combination with conventional hydraulically actuated friction brakes, to provide accurate torque control in an anti-lock brake system, traction control system, or a vehicle stability control system. The estimated torque produced by the electromagnetic retarder may be calculated based on the retarder torque model discussed in detail below, particularly those sections referring to Equation (14). The accuracy of this estimation is evidenced by the overlayed plots of estimated torque and measured torque for the front and rear wheel retarders (FIGS. 8 and 9, respectively). For completeness it is noted that the measured wheel torque is the net torque at the wheel indicated by a torque sensor. The illustrative tests were designed to minimize the effects of driveline torque and inertia on the measured wheel torque. The test conditions included performing all braking tests in neutral gear, limiting tests to straight line braking with only eddy current machines as the retarding device, and dry asphalt road conditions.

Using Equation (14), the control unit estimates the torque that an electromagnetic device is capable of generating at a given rotor speed and current. As noted above, if the estimated torque for the desired wheel is less than the torque required pursuant to (10) through (13), then the control unit 22 determines the amount of torque to be generated by the other wheel on the same side of the vehicle as described below.

C. Multiple Wheels

When the braking device associated with the desired single wheel is incapable of generating the desired torque prior to saturation, both front and rear wheel braking devices can be used to generate the requested torque. The control unit 22 is configured to identify when retarder saturation occurs (Steps 90–96) and to generate current commands to the retarders associated with each wheel on a side of the vehicle when the control yaw moment would saturate a single actuator. Equations (15)–(18) below may be used to determine the amount of torque to be generated by each wheel. First, the torque to be generated by the wheel that is most effective at correcting the tracking error (e.g., the rear left wheel for counterclockwise understeering) is set at the estimated maximum or saturation level (Test) calculated above. As illustrated in Steps 100-106 and described below by Equations (15)–(18) the control unit then determines the amount of torque to be generated by the next most effective wheel (e.g., the left front wheel in a counterclockwise understeering condition).

With the above in mind, Equation (15) sets forth an equation for the braking of the front and rear left wheels for a counterclockwise understeered condition.

$$M_z = (c\cos\delta - a\sin\delta)F_{xFL} + cF_{RL} = (c\cos\delta - a\sin\delta)\frac{T_{bFL}}{R} + c\frac{T_{bRL}}{R} \quad (15)$$

$$\text{If } T_{bRL} > T_{estRL}, \text{ then } T_{bRL} = T_{estRL}$$

$$T_{bFL} = \frac{RM_z - cT_{estRL}}{(c\cos\delta - a\sin\delta)}$$

Similarly, Equation (16) sets forth an equation for determining the front and rear right wheel braking torques for an understeered vehicle turning clockwise.

$$M_z = -(d\cos\delta - a\sin\delta)F_{xFR} - dF_{RR} = -(d\cos\delta - a\sin\delta)\frac{T_{bFR}}{R} - d\frac{T_{bRR}}{R} \quad (16)$$

$$\text{If } T_{bRR} > T_{estRR}, \text{ then } T_{bRR} = T_{estRR}$$

$$T_{bFR} = \frac{RM_z - dT_{estRR}}{(d\cos\delta - a\sin\delta)}$$

Further, Equation (17) may be used for determining the brake torque for the front and rear right wheels when the vehicle is oversteered and turned counterclockwise.

$$M_z = -(d\cos\delta - a\sin\delta)F_{xFR} - dF_{RR} = -(d\cos\delta + a\sin\delta)\frac{T_{bFR}}{R} - d\frac{T_{bRR}}{R} \quad (17)$$

$$\text{If } T_{bFR} > T_{estFR}, \text{ then } T_{bFR} = T_{estFR}$$

$$T_{bRR} = -\frac{RM_z + (d\cos\delta + a\sin\delta)T_{estFR}}{d}$$

Finally, Equation (18) may be used to determine the braking torque for the front and rear left wheels in a clockwise oversteered condition.

$$M_z = (c\cos\delta - a\sin\delta)F_{xFL} + cF_{RL} = (c\cos\delta - a\sin\delta)\frac{T_{bFL}}{R} + c\frac{T_{bRL}}{R} \quad (18)$$

$$\text{If } T_{bFL} > T_{estFL}, \text{ then } T_{bFL} = T_{estFL}$$

$$T_{bRL} = \frac{RM_z - (c\cos\delta - a\sin\delta)T_{estFL}}{c}$$

Again, for completeness, it is noted that if the denominator of Equations (15) or (16) in Steps 100 or 102 is equal to zero, the denominator is set to TOL.

4. Generating Current Command

Once the torque command has been calculated for each of the selected electromagnetic retarders based on the above equations, the control unit 22 communicates a current command to the respective retarder, e.g., eddy current machine, in (Step 46) for a given wheel speed (assuming that the retarder is not saturated) and is represented by Equation (19):

$$I_{XY} = \frac{(T_{bXY} - f_0^{xy}(\omega))}{f_1^{xy}(\omega)} \quad (19)$$

where $I_{XY}$=Current command to FL, FR, RL, or RR eddy current machine $T_{bXY}$=Desired torque for the FL, FR, RL, or RR eddy current machine $f_0^{xy}, f_1^{xy}$=Speed dependent retarder parameters Equation (19) is derived from the relationship set forth in Equation (14), which established the quadratic equation as a function of current and rotor speed, with the assumption that the measured current is the same as the commanded current, which is particularly applicable for relatively short time constants as in the illustrated embodiment. More particularly, given the desired torque and measured rotor speed, an analytical quadratic equation solver may be used to obtain the current command from Equation (14) as follows:

$$I_{cmd} = \frac{-f_1(\omega) + \sqrt{f_1^2(\omega) - 4f_2(\omega)(f_0(\omega) - T_{Des})}}{2f_2(\omega)} \quad (20)$$

$$I_{cmd} = \frac{f_1(\omega)}{2f_2(\omega)}\left(\sqrt{1 - \frac{4f_2(\omega)(f_0(\omega) - T_{Des})}{f_1^2(\omega)}} - 1\right)$$

If the second term in the square root symbol is much smaller than unity, the term under square can be expanded in a Taylor series form as follows:

$$(1+x)^{\frac{1}{2}} = 1 + \frac{x}{2} - \frac{1}{2!}\frac{x^2}{4} + \ldots$$

Using the above expansion, Equation (20) is modified and re-written as follows:

$$I_{cmd} = \frac{f_1(\omega)}{2f_2(\omega)}\left(\left[1 - \frac{2f_2(\omega)(f_0(\omega) - T_{Des})}{f_1^2(\omega)} + \ldots\right] - 1\right)$$

If the second term in the square bracket of Equation (20) is much smaller than unity, the higher order terms can be omitted. Simplifying the above equation yields Equation (19) which is the proposed open loop control law for an eddy current brake system. The coefficient function $f_0$ and $f_1$ are estimated through a parameter estimation scheme as mentioned above. Appropriate checks should be performed for coefficient function $f_1$ in order to prevent any possible overflow condition.

$$I_{cmd} = \frac{(T_{Des} - f_0(\omega))}{f_1(\omega)}$$

From the above description, it will be appreciated that the YSC system and method of the present invention provides numerous advantages over conventional systems and techniques. By way of example, the present invention utilizes an improved control yaw moment calculation methodology, based on a sliding mode control law based and a lumped mass vehicle model, to minimize tracking error between a desired vehicle yaw rate and an actual vehicle yaw rate. This method provides smoother, more stable, and more robust control so as to minimize undesirable braking device chatter. While the YSC system of the present invention may be used with a variety of braking devices, the disclosed embodiment particularly relates to the use of electromagnetic braking devices, and more particularly to eddy current machines, so as to provide improved response times and undesirable noise, vibration, and harshness (NVH) during operation. Further, the invention accurately models the torque characteristics of the electromagnetic retarders, including through an improved saturation torque estimation technique, that again improves the control and operation of the overall system.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A yaw stability system for a vehicle having a plurality of wheels each with a torque control element said yaw stability system comprising:
   a yaw rate sensor measuring a vehicle yaw rate;
   a plurality of braking devices each operably associated with one of the torque control elements and configured to exert a braking torque on the control element in response to a control command, wherein said braking devices are eddy current machines and wherein said control command is a current command; and
   a control unit communicating with said yaw rate sensor and configured to:
      identify a desired yaw rate,
      determine a yaw rate tracking error based on the difference between the desired yaw rate and the vehicle yaw rate,
      determine a yaw condition of the vehicle based on the vehicle yaw rate,
      determine a control yaw moment to minimize the yaw rate tracking error,
      select one or more of said plurality of braking devices based on the yaw condition, and
      communicate a control command to the one or more selected braking devices to induce said control yaw moment,
   wherein the control unit estimates braking device saturation torque ($T_{est}$) based on a quadratic function of rotor speed and excitation current.

2. The yaw stability system of claim 1 wherein said control unit determines the control yaw moment using a sliding mode control law based on a lumped mass vehicle model.

3. The yaw stability system of claim 2 wherein said control unit determines the control yaw moment (Mz) based on the following equation $$M_z = I_{zz}\dot{r}_{des} -$$
$$[a[(C_{FL} + C_{FR})\alpha_F\cos\delta + (\eta_{FL} + \eta_{FR})F_{zF}\sin\delta] - b(C_{RR} + C_{RL})\alpha_R +$$
$$(c*C_{FL} - d*C_{FR})\alpha_F\sin\delta - c(\eta_{FL}F_{zF}\cos\delta + \eta_{RL}F_{zR}) +$$
$$d(\eta_{FR}F_{zF}\cos\delta + \eta_{RR}F_{zR})] + I_{zz}\eta SAT\left(\frac{r_{des} - r}{\phi}\right).$$

4. The yaw stability system of claim 1 wherein the quadratic function is:

$$T_{est} = f_0(\omega) + f_1(\omega)*i + f_2(\omega)*i^2.$$

5. The yaw stability system of claim 4 wherein the coefficient functions $f_0(\omega)$, $f_1(\omega)$, and $f_2(\omega)$ are estimated from steady stare test data performed for various rotor speeds.

6. The yaw stability system of claim 5 wherein the coefficient functions $f_0(\omega)$, $f_1(\omega)$, and $f_2(\omega)$ are defined by $$f_1(\omega) = \alpha_{i0} + \alpha_{i1}\omega + \alpha_{i2}\omega^2$$

and wherein the parameters $\alpha ij$ are estimated through a least square fit based on the steady state test data.

7. The yaw stability system of claim 6 wherein the coefficient functions $f_0(\omega)$, $f_1(\omega)$, and $f_2(\omega)$ are estimated by recalculating the coefficient functions $f_0(\omega)$, $f_1(\omega)$, and $f_2(\omega)$ for each rotor speed based on the estimates of parameters $\alpha ij$ and the parameters $\alpha ij$ are then estimated based on the recalculated coefficient functions $f_0(\omega)$, $f_1(\omega)$, and $f_2(\omega)$ through a least square fit based on the steady state test data.

8. The yaw stability system of claim 1 wherein said control unit is an open loop controller providing a current optimal torque without a current feedback signal from the eddy current machines.

9. The yaw stability system of claim 1 wherein the control unit is a parametric model control unit.

10. A method for controlling yaw in a vehicle having front left, front right, roar left, and rear right wheels and a plurality of braking devices each associated with one of the wheels, said method comprising:
  determining a vehicle yaw rate;
  determining a desired yaw rate;
  calculating a yaw rate error based on the difference between the desired yaw rate and the vehicle yaw rate;
  determining a control yaw moment using a sliding mode control law based on a lumped mass vehicle model;
  selecting one of the braking devices based on a vehicle yaw condition;
  determining a control command for the selected braking device based on the control yaw moment, wherein the step of determining a control command further includes determining a required torque for the selected braking device, said required torque being the torque required from the selected braking device to induce the control yaw moment; and
  communicating the control command to die one or more selected braking devices, wherein the plurality of braking devices are eddy current machines, wherein the control command is a current command, wherein the step of determining the current command further includes determining a saturation torque for the selected braking device based on a quadratic function of control element speed and excitation current, and wherein the step of determining the saturation torque ($T_{est}$) is based on the following equation:

$$T_{est} = f_0(\omega) + f_1(\omega) * i + f_2(\omega) * i^2$$

and wherein the method further includes estimating the coefficient functions $f_0(\omega)$, $f_1(\omega)$, and $f_2(\omega)$ from steady state test data performed for various rotor speeds.

11. The method of claim 10 wherein the step of determining the current command further includes comparing the saturation torque for the selected braking device to the required torque.

12. The method of claim 11 wherein the step of determining the current command further includes determining a command current for the selected braking device if the required torque is less than the saturation torque.

13. The method of claim 11 wherein, if the required torque is greater than the saturation torque, the step of communicating the current command funkier includes sending a saturation current command to the selected braking device, selecting a second braking device, and sending a second current command to the second braking device to cause the second braking device to exert a torque equal to the difference between the control yaw moment and the saturation torque, and wherein the first and second selected braking devices are onto same lateral side of the vehicle.

14. The method of claim 10 wherein the coefficient functions $f_0(\omega)$, $f_1(\omega)$, and $f_2(\omega)$ are defined by $$f_1(\omega) = \alpha_{i0} + \alpha_{i1}\omega + \alpha_{i2}\omega^2$$

and wherein the step of estimating the coefficient functions $f_0(\omega)$, $f_1(\omega)$, and $f_2(\omega)$ includes estimating parameters αij through a least square fit based on the steady state test data, includes recalculating the coefficient functions $f_0(\omega)$, $f_1(\omega)$, and $f_2(\omega)$ for each rotor speed and based on the estimates of parameters αij, and re-estimating the parameters αij based on the recalculated coefficient functions $f_0(\omega)$, $f_1(\omega)$, and $f_2(\omega)$ through a least square fit based on the steady state test data.

15. The method of claim 10 wherein the step of determining the control yaw moment includes calculating the control yaw moment based on a derivative of the desired yaw rate.

16. The method of claim 10 wherein the step of determining the control yaw moment includes calculating the control yaw moment based on a saturation function.

17. The method of claim 10 wherein the step of determining the control yaw moment includes calculating the control yaw moment (Mz) based on the following equation:

$$M_z = I_{zz}\dot{r}_{des} - [a[(C_{FL} + C_{FR})\alpha_F\cos\delta + (\eta_{FL} + \eta_{FR})F_{zF}\sin\delta] - b(C_{RR} + C_{RL})\alpha_R + (c * C_{FL} - d * C_{FR})\alpha_F\sin\delta - c(\eta_{FL}F_{zF}\cos\delta + \eta_{RL}F_{zR}) + d(\eta_{FR}F_{zF}\cos\delta + \eta_{RR}F_{zR})] + I_{zz}\eta SAT\left(\frac{r_{des} - r}{\phi}\right).$$

* * * * *

UNITED STATES PATENT AND TRADEMARK OFFICE
CERTIFICATE OF CORRECTION

PATENT NO. : 7,137,673 B2  
APPLICATION NO. : 10/608906  
DATED : November 21, 2006  
INVENTOR(S) : Sohel Anwar It is certified that error appears in the above-identified patent and that said Letters Patent is hereby corrected as shown below:

| Column | Line | Description |
|--------|------|-------------|
| 10 | 2 | Replace "roar left" with -- rear left -- |
| 18 | 1 | Replace "funkier includes" with -- further includes -- |
| 18 | 8 | Replace "are onto same" with -- are on the same -- |

Signed and Sealed this

First Day of May, 2007

JON W. DUDAS  
*Director of the United States Patent and Trademark Office*